United States Patent
Lan et al.

(10) Patent No.: US 12,293,857 B2
(45) Date of Patent: May 6, 2025

(54) COMPOSITE OF NON-POLAR ORGANIC POLYMER, POLAR ORGANIC POLYMER, AND ULTRA-LOW-WETTABILITY CARBON BLACK

(71) Applicants: Dow Global Technologies LLC, Midland, MI (US); Rohm and Haas Company, Collegeville, PA (US)

(72) Inventors: Tian Lan, Langhorne, PA (US); Xindi Yu, Phoenixville, PA (US); Michael Q. Tran, Wayne, PA (US); Paul J. Brigandi, Schwenksville, PA (US); Jeffrey M. Cogen, Flemington, NJ (US); Timothy J. Person, Pottstown, PA (US); Yichi Zhang, Novi, MI (US); Junsi Gu, Malvern, PA (US); Jessica Ye Huang, Sugarland, TX (US); Casey A. Wolf, Burlington, NJ (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 975 days.

(21) Appl. No.: 16/977,603

(22) PCT Filed: Mar. 22, 2019

(86) PCT No.: PCT/US2019/023511
§ 371 (c)(1),
(2) Date: Sep. 2, 2020

(87) PCT Pub. No.: WO2019/190901
PCT Pub. Date: Oct. 3, 2019

(65) Prior Publication Data
US 2021/0005344 A1    Jan. 7, 2021

Related U.S. Application Data

(60) Provisional application No. 62/649,128, filed on Mar. 28, 2018.

(51) Int. Cl.
*H01B 1/24* (2006.01)
*C08L 23/06* (2006.01)
*C08L 23/0853* (2025.01)

(52) U.S. Cl.
CPC ............. *H01B 1/24* (2013.01); *C08L 23/06* (2013.01); *C08L 23/0853* (2013.01); *C08L 2203/20* (2013.01); *C08L 2205/025* (2013.01); *C08L 2207/066* (2013.01); *C08L 2312/00* (2013.01)

(58) Field of Classification Search
CPC .. C08L 23/06; C08L 23/0853; C08L 2203/20; C08L 2205/025; C08L 2207/066; C08L 2312/00; C08K 2201/001; C08K 2201/006; C08K 3/04; H01B 1/24
See application file for complete search history.

(56) References Cited

U.S. PATENT DOCUMENTS

| | | |
|---|---|---|
| 5,733,480 A | 3/1998 | Lee et al. |
| 6,277,303 B1 | 8/2001 | Foulger |
| 6,284,832 B1 | 9/2001 | Foulger et al. |
| 6,331,586 B1 | 12/2001 | Thielen et al. |
| 6,482,386 B2 | 11/2002 | Atchetee et al. |
| 7,767,910 B2 | 8/2010 | Kjellqvist et al. |
| 8,318,872 B2 | 11/2012 | Savatsky et al. |
| 8,388,868 B2 | 3/2013 | Easter |
| 8,513,525 B2 | 8/2013 | Torgersen et al. |
| 8,741,183 B2 | 6/2014 | Kolditz et al. |
| 2005/0063893 A1 | 3/2005 | Ayala et al. |
| 2007/0112127 A1 | 5/2007 | Soediono et al. |
| 2009/0020749 A1 | 1/2009 | Jager et al. |
| 2009/0056973 A1* | 3/2009 | Kjellqvist ............... C08L 23/04 524/502 |
| 2011/0186328 A1 | 8/2011 | Easter |
| 2012/0018190 A1 | 1/2012 | Smedberg et al. |
| 2012/0273253 A1 | 11/2012 | Nilsson et al. |
| 2014/0377659 A1 | 12/2014 | Oljaca et al. |
| 2015/0004411 A1 | 1/2015 | Malik et al. |
| 2017/0011817 A1 | 1/2017 | Uematsu et al. |
| 2021/0005344 A1 | 1/2021 | Lan et al. |

FOREIGN PATENT DOCUMENTS

| | | |
|---|---|---|
| JP | A-H11-329077 | 11/1999 |
| JP | 2003-147134 A | 5/2003 |
| WO | 01/40384 A1 | 6/2001 |

(Continued)

OTHER PUBLICATIONS

Clirik Carbon Black Applications webpage (https://www.clirikchina.com/news/Industry_News/Carbon-Black-Applications.html), 7 pages. (Year: 2022).*

(Continued)

*Primary Examiner* — Matthew E. Hoban
*Assistant Examiner* — Lynne Edmondson

(57) ABSTRACT

A semiconductive composite material comprising a non-polar organic polymer, a polar organic copolymer, and an electrical conducting effective amount of an ultra-low-wettability carbon black. Also a method of making the composite material; a crosslinked polyethylene product made by curing the composite material; manufactured articles comprising a shaped form of the inventive composite material or product; and methods of using the inventive composite material, product, or articles.

15 Claims, No Drawings

(56) References Cited

FOREIGN PATENT DOCUMENTS

WO    2007092454    8/2007

OTHER PUBLICATIONS

Office Action from corresponding Korean Application No. 10-2020-7029105 dated Aug. 10, 2023.
PCT/US2019/023511, International Preliminary Report on Patentability with a mailing date of Jul. 28, 2020.
PCT/US2019/023511, International Search Report and Written Opinion with a mailing date of Jun. 18, 2019.
Ray and Khastgir, Polymer, 1993, pp. 2030-2037, vol. 34, No. 10.
Razd'Yakonova et al., International Polymer Science and Technology, 2015, pp. 10-13. No. 2.
Cabot Corporation, LITX TM 50 Conductive Additive, 2014.
Cabot Corporation, LITX® 66 Conductive Additive, 2016.
Cabot Corporation, LITX TM 200 Conductive Additive, 2014.
The Dow Chemical Company, Dow TM LDPE 722 Low Density Polyethylene Resin, 2011.
Office action from corresponding Taiwan Application No. 108108677 dated Mar. 21, 2024.

\* cited by examiner

COMPOSITE OF NON-POLAR ORGANIC POLYMER, POLAR ORGANIC POLYMER, AND ULTRA-LOW-WETTABILITY CARBON BLACK

FIELD

Composite of organic polymers and carbon black, and related aspects.

INTRODUCTION

Patents in the field include U.S. Pat. Nos. 6,277,303 B1; 6,284,832 B1; 6,331,586 B1; and 7,767,910 B2. U.S. Pat. Nos. 6,277,303 B1 and 6,284,832 B1 examples use Vulcan XC 72 carbon black. U.S. Pat. No. 6,331,586 B1 examples use one of Printex XE2 carbon black (DeGussa), Black Pearls 1000 carbon black (Cabot Corp.), Vulcan XC 72 carbon black (Cabot Corp.), Ketjenblack EC600JD carbon black (Akzo), Vulcan P carbon black (Cabot Corp.), United 120 carbon black (Cabot Corp.), or Denka Black carbon black (Denka). U.S. Pat. No. 7,767,910 B2 examples use Vulcan XC 500 carbon black. Cabot Corp. is Cabot Corporation, Billerica, Massachusetts, USA. Another carbon black is Acetylene Black AB 100%-01 (Soltex, Inc., Houston, Texas, USA). Each of the foregoing carbon blacks does not have ultra-low-wettability character.

SUMMARY

We recognized that high contents of carbon black in prior semiconductive composite materials used in semiconductive layers of medium- to extra-high voltage electrical power cables can cause unwanted problems. These include undesirably high moisture uptake into the semiconductive layer during operational use of the power cable. We also recognized that too low contents of carbon black in these semiconductive composite materials can cause other unwanted problems in power cables, such as volume resistivity that is too high or a lack of electrical percolation. A challenge is to reduce carbon black content in a semiconductive composite material without destroying desirable electrical properties of the material.

Prior attempts to solve these problems combined partially immiscible polar and non-polar polymers with prior carbon black to form a semiconductive composite material with at least one continuous polymer phase. Some of the prior carbon black is located in one of the continuous phases or at interfaces between two phases and some of the carbon black is located in discontinuous phases. The results were often unsatisfactory because of only partial segregation of the carbon black and/or poor dispersion of carbon black in the phase it mostly separates into. We provide here an alternative, simplified technical solution that overcomes the negative effects of too high and too low carbon black contents. Embodiments of the technical solution include those described below.

A semiconductive composite material comprising, or consisting essentially of, a non-polar organic polymer, a polar organic polymer, and an electrical conducting effective amount of an ultra-low-wettability carbon black.

A method of making the semiconductive composite material.

An electrical conductor device comprising a conductor core and a semiconductive layer disposed thereon, the semiconductive layer comprising the semiconductive composite material.

A method of transmitting electricity via the conductor core of the electrical conductor device.

DETAILED DESCRIPTION

The Summary and Abstract are incorporated here by reference.

The ultra-low wettability nature of the ultra-low-wettability carbon black may be characterized by any suitable technique or method. Examples are oil absorption number (OAN), moisture uptake number, and surface wettability profile, all of which are described later. During melt mixing or melt processing of the semiconductive composite material, the ultra-low-wettability carbon black has a stronger tendency to become sequestered in a phase of the non-polar organic polymer phase over a phase of the polar organic polymer no matter whether the ultra-low-wettability carbon black has been first added to the polar organic polymer, the non-polar organic polymer, or a blend of the non-polar and polar organic polymers. Almost no particles of the ultra-low-wettability carbon black are observable by scanning electron microscopy (SEM) in the polar organic polymer phase.

The non-polar organic polymer is distinct in structure from the polar organic polymer of the semiconductive composite material. The non-polar organic polymer may be any homopolymer made by polymerizing an unsubstituted olefin monomer containing 1 or 2 carbon-carbon double bonds or any copolymer made by polymerizing two or more different unsubstituted olefin monomers independently containing 1 or 2 carbon-carbon double bonds. Each such olefin monomer independently may be acyclic or cyclic. The acyclic olefin monomer may be straight chain or branched chain, and the straight chain olefin monomer may be an alpha-olefin or a straight chain diene. The non-polar organic polymer may be free of silicon atoms, alternatively may contain copolymerized therein or grafted thereto an olefin-functional hydrolyzable silane comonomer.

In some aspects the non-polar organic polymer may be a non-polar ethylene-based or propylene-based polymer. The non-polar ethylene-based polymer consists essentially of from 50 to 100 weight percent (wt %) constitutional units derived from ethylene ($H_2C=CH_2$) and from 50 to 0 wt %, respectively, constitutional units derived from at least one unsubstituted olefin comonomer other than ethylene and/or an olefin-functional hydrolyzable silane comonomer. The olefin comonomer may be an unsubstituted ($C_3$-$C_{20}$)olefin, alternatively an unsubstituted ($C_4$-$C_{20}$)olefin, alternatively an unsubstituted ($C_4$-$C_8$)olefin, alternatively 1-butene, alternatively 1-hexene, alternatively 1-octene. The non-polar ethylene-based polymer may be a polyethylene homopolymer or an ethylene/alpha-olefin copolymer. The non-polar ethylene-based polymer may be free of silicon atoms, alternatively may contain copolymerized therein or grafted thereto an olefin-functional hydrolyzable silane comonomer. The non-polar propylene-based polymer may consist essentially of from 50 to 100 wt % of constitutional units derived from propylene ($H_2C=CHCH_3$) and from 50 to 0 wt % of constitutional units derived from an olefin comonomer that is a hydrocarbon selected from ethylene, a ($C_4$-$C_{20}$)alpha-olefin, a ($C_4$-$C_{20}$)diene, and a combination of any two or more thereof.

In the semiconductive composite material, the polar organic polymer consists essentially of non-polar monomeric units and polar comonomeric units. The polar organic polymer may be made by polymerizing the unsubstituted olefin monomer and a polar comonomer. The polar organic polymer may be a polar ethylene-based polymer, such as an ethylene/unsaturated carboxylic ester copolymer comprising ethylenic monomeric units and unsaturated carboxylic ester (or acid) comonomeric units such as those derived from an unsaturated carboxylic ester. The proportion of the polar comonomeric units in the polar organic polymer may be from 5 to 40 wt %, alternatively from 20 to 35 wt %, alternatively from 25 to 31 wt %, based on total weight of the polar organic polymer. The proportion of the polar comonomeric units to the non-polar monomeric units in the polar organic polymer is sufficient to cause at least 50 wt %, alternatively at least 75 wt %, alternatively at least 90 wt %, alternatively at least 95 wt % of the polar organic polymer to be immiscible in the non-polar organic polymer of the semiconductive composite material. The wt % of the polar organic polymer that is immiscible in the non-polar organic polymer of the semiconductive composite material may be determined by scanning electron microscopy (SEM) according to the Phase Morphology Test Method, described later.

Certain inventive embodiments are described below as numbered aspects for easy cross-referencing.

Aspect 1. A semiconductive composite material comprising, or consisting essentially of, (A) a non-polar polyolefin polymer (e.g., non-polar ethylene-based polymer) in a first phase, (AA) a polar ethylene-based copolymer in a second phase, which is at least partially immiscible in the first phase, and an electrical conducting effective amount of (B) an ultra-low-wettability carbon black (ULW-CB), which has a Brunauer-Emmett-Teller (BET) nitrogen surface area of from 35 to 190 square meters per gram ($m^2/g$), measured by BET Nitrogen Surface Area Test Method (described later); and an oil absorption number (OAN) from 115 to 180 milliliters of oil per 100 grams (mL/100 g) (115 to 180 cubic centimeters per 100 grams (cc/100 g)), measured by Oil Absorption Number Test Method (described later). The (A) non-polar polyolefin polymer (e.g., non-polar ethylene-based polymer) may be characterized by a polar component of surface energy from greater than 0 to less than or equal to 5 millijoules per square meter ($mJ/m^2$), measured by Surface Energy Test Method, described later. The (A) non-polar polyolefin polymer (e.g., non-polar ethylene-based polymer) may be a single component polymer having a unimodal molecular weight distribution (MWD, $M_w/M_n$) such as a single low density polyethylene (LDPE), medium density polyethylene (MDPE), or high density polyethylene (HDPE). Alternatively the (A) non-polar polyolefin polymer (e.g., non-polar ethylene-based polymer) may be a multi-component polymer having a multimodal MWD ($M_w/M_n$) polymer such as in a bimodal LDPE. The multimodal MWD polymer embodiment of (A) may be made in a single reactor using two different catalysts (e.g., a Ziegler-Natta catalyst and a metallocene catalyst or two different metallocene catalysts) or the same catalyst under two different reactor conditions, or made in two different reactors, or may be made by blending together two different unimodal MWD polymers, such as blending a unimodal MWD LDPE and a unimodal MWD linear low density polyethylene (LLDPE). The (AA) polar ethylene-based copolymer may be a single component copolymer having a unimodal MWD ($M_w/M_n$) such as an ethylene/unsaturated carboxylic ester copolymer having a unimodal MWD, or multi-component copolymer having a multimodal (MWD, $M_w/M_n$) such as two different ethylene/vinyl carboxylate copolymers made in two different reactors, or a combination of an ethylene/vinyl carboxylate copolymer and an ethylene/alkyl (meth)acrylate copolymer. Each of the ethylene/vinyl carboxylate copolymers independently may be ethylene/vinyl acetate (EVA) copolymers. Each of the ethylene/alkyl (meth)acrylate copolymer independently may be an ethylene/methyl acrylate copolymer, an ethylene/ethyl acrylate copolymer, an ethylene/methyl methacrylate copolymer, or an ethylene/ethyl methacrylate copolymer.

Aspect 2. The semiconductive composite material of aspect 1 wherein the (B) ULW-CB is characterized by any one of limitations (i) to (iii): (i) the (B) ULW-CB has a BET nitrogen surface area from 40 to 63 $m^2/g$, measured by the BET Nitrogen Surface Area Test Method; and an OAN from 120 to 150 mL/100 g, measured by the Oil Absorption Number Test Method; (ii) the (B) ULW-CB has a BET nitrogen surface area from 120 to 180 $m^2/g$, measured by the BET Nitrogen Surface Area Test Method; and an OAN from 150 to 175 mL/100 g, measured by the Oil Absorption Number Test Method; and (iii) the (B) ULW-CB is a blend of the ULW-CBs of (i) and (ii). An example of (i) is LITX 50 Conductive Additive. An example of (ii) is LITX 200 Conductive Additive. An example of (iii) is a blend of LITX 50 and LITX 200 Conductive Additives. LITX 50 and LITX 200 Conductive Additives are carbon black products from Cabot Corporation for use in electrodes of lithium-ion batteries. LITX 50 Conductive Additive has, and in some aspects the (B) ULW-CB is characterized by, a BET nitrogen surface area from 45 to 60 $m^2/g$, measured by the BET Nitrogen Surface Area Test Method; and an OAN from 125 to 145 mL/100 g, measured by the Oil Absorption Number Test Method. LITX 200 Conductive Additive has, and in some aspects the (B) ULW-CB is characterized by, a BET nitrogen surface area from 125 to 175 $m^2/g$, measured by the BET Nitrogen Surface Area Test Method; and an OAN from 152 to 172 mL/100 g, measured by the Oil Absorption Number Test Method.

Aspect 3. A semiconductive composite material comprising, or consisting essentially of, (A) a non-polar polyolefin polymer (e.g., non-polar ethylene-based polymer) in a first phase, (AA) a polar ethylene-based copolymer in a second phase, which is at least partially immiscible in the first phase, and an electrical conducting effective amount of (B) an ultra-low-wettability carbon black (ULW-CB), which has a surface wettability profile characterized by wettability≤0.0101 at surface coverage of 0.02, and wettability≤0.0101 at surface coverage of 0.04, and wettability≤0.0099 at surface coverage of 0.06, and wettability≤0.0111 at surface coverage of 0.08, and wettability≤0.0113 at surface coverage of 0.10, measured by inverse gas chromatography (IGC) according to Wettability Test Method (described later).

Aspect 4. The semiconductive composite material of any one of aspects 1 to 3 wherein the (B) ULW-CB is characterized by any one of limitations (i) to (vii): (i) a BET nitrogen surface area from 40 to 180 $m^2/g$, alternatively from 40 to 63 $m^2/g$, alternatively from 150 to 175 $m^2/g$, measured by the BET Nitrogen Surface Area Test Method; (ii) a water uptake of from 400 to 2400 parts per million (ppm, weight), alternatively from 450 to 1,000 ppm, alternatively from 501 to 600 ppm, measured by Moisture Uptake Test Method (described later); (iii) a surface wettability profile characterized by wettability≤0.0058 at surface coverage of 0.02, and wettability≤0.0070 at surface coverage of 0.04, and wettability≤0.0075 at surface coverage of 0.06, and wettability≤0.0086 at surface coverage of 0.08, and wettability≤0.0091 at surface coverage of 0.10, measured by IGC according to the Wettability Test Method; alternatively a surface wettability profile characterized by wettability≤0.0014 at surface coverage of 0.02, and wettability≤0.0039 at surface coverage of 0.04, and wettability≤0.0051 at surface coverage of 0.06, and wettability≤0.0061 at surface coverage of 0.08, and wettability≤0.0069 at surface coverage of 0.10, measured by IGC according to the Wettability Test Method; (iv) both (i) and (ii); (v) both (i) and (iii); (vi) both (ii) and (iii); (vii) a combination of (i), (ii), and (iii). LITX 50 and LITX 200 Conductive Additives independently have the foregoing surface wettability profiles. In some aspects the (B) ULW-CB is characterized such that the total BET nitrogen surface area of the (B) ULW-CB, measured at 10 wt % amount in the semiconductive composite, is less than 6.0 m$^2$/g as measured by the BET Nitrogen Surface Area Test Method. The (B) ULW-CB also has extremely low moisture uptake relative to prior carbon blacks.

Aspect 5. The semiconductive composite material of any one of aspects 1 to 4 that is free of any carbon black other than the ultra-low-wettability carbon black.

Aspect 6. The semiconductive composite material of any one of aspects 1 to 5 characterized by any one of limitations (i) to (v): (i) comprising, or consisting essentially of, from 61.0 to 99.0 wt % of a combination of the (A) non-polar polyolefin polymer and the (AA) polar ethylene-based polymer; and from 39.0 to 1.0 wt % of the (B) ULW-CB, based on total weight of the semiconductive composite material; wherein the combination of (A) and (AA) has from 5 to 95 wt % of (A) and from 95 to 5 wt % of (AA) based on the combined weight of (A) and (AA); (ii) the (A) non-polar polyolefin polymer is a non-polar ethylene-based polymer; (iii) both (i) and (ii); (iv) the (A) non-polar polyolefin polymer is a non-polar propylene-based polymer; and (v) both (i) and (iv). In some aspects the combination has from 35 to 55 wt % of (A) and from 65 to 45 wt % of (AA), alternatively from 39 to 51 wt % of (A) and from 61 to 49 wt % of (AA), based on the combined weight of (A) and (AA). For example, the combination may have 50 wt % of (A) and 50 wt % of (AA), alternatively 45 wt % of (A) and 55 wt % of (AA), alternatively 40 wt % of (A) and 60 wt % of (AA), based on the combined weight of (A) and (AA). In some aspects the semiconductive composite material containing any one of the foregoing combinations may have from 1.5 to less than 15 wt % of the (B) ULW-CB, alternatively from 1.9 to 11 wt % of the (B) ULW-CB, based on total weight of the semiconductive composite material. For example, in some aspects the semiconductive composite material containing any one of the foregoing combinations may have 2 wt %, alternatively 5 wt %, alternatively 7 wt %, alternatively 10.0 wt % of the (B) ULW-CB, based on total weight of the semiconductive composite material.

Aspect 7. The semiconductive composite material of any one of aspects 1 to 6, further comprising, or consisting essentially of, at least one additive chosen from: (C) a plastomer; (D) an antioxidant; (E) an organic peroxide; (F) a scorch retardant; (G) an alkenyl-functional coagent; (H) a nucleating agent; (I) a processing aid; (J) an extender oil; (K) a stabilizer (e.g., a compound that inhibits ultraviolet (UV) light-associated degradation). The at least one additive differs from constituents (A), (AA), and (B) in at least composition.

Aspect 8. The semiconductive composite material of any one of aspects 1 to 7, characterized by a log(volume resistivity), measured by Volume Resistivity Test Method (described later), of <3.0 log(Ohm-centimeter (Ohm-cm)) at an electrical conducting effective amount of 10.0 wt %, or <4.0 log(Ohm-cm) at an electrical conducting effective amount of 7 wt %, or <10.0 log(Ohm-cm) at an electrical conducting effective amount of 5 wt %, or <15.5 log(Ohm-cm) at the electrical conducting effective amount of 2.0 wt %, wherein electrical conducting effective amount of the (B) ULW-CB is based on total weight of the semiconductive composite material. In some aspects the log(volume resistivity) of aspect 8 is from 1.5 to 2.3 log(Ohm-cm) at an electrical conducting effective amount of 10.0 wt %, or from 1.7 to 3.1 log(Ohm-cm) at an electrical conducting effective amount of 7 wt %, or from 3.5 to 9.0 log(Ohm-cm) at an electrical conducting effective amount of 5 wt %, or from 13.5 to 14.4 log(Ohm-cm) at the electrical conducting effective amount of 2.0 wt %, wherein electrical conducting effective amount of the (B) ULW-CB is based on total weight of the semiconductive composite material. In some aspects the semiconductive composite material of aspect 8 is characterized by a log(volume resistivity) profile consisting of each of the foregoing ranges in the immediately preceding sentence.

Aspect 9. The semiconductive composite material of any one of aspects 1 to 8 characterized by a log(volume resistivity) of ≤10 Log(Ohm-cm) at total BET N2 surface area of carbon black in composite of 5.0 to 10.0 m$^2$/g; or 12 Log(Ohm-cm) at total BET N2 surface area of carbon black in composite of 2.0 to 5.0 m$^2$/g; or 15 Log(Ohm-cm) at total BET N2 surface area of carbon black in composite of 0.5 to 2.0 m$^2$/g. In some aspects the log(volume resistivity) of aspect 9 is from 5.1 to 5.9 Log(Ohm-cm) at total BET N2 surface area of carbon black in composite of 5.0 to 10.0 m$^2$/g; or from 2.5 to 8.5 Log(Ohm-cm) at total BET N2 surface area of carbon black in composite of 2.0 to 5.0 m$^2$/g; or from 13.6 to 14.6 Log(Ohm-cm) at total BET N2 surface area of carbon black in composite of 0.5 to 2.0 m$^2$/g. In some aspects the semiconductive composite material of aspect 9 is characterized by a log(volume resistivity) profile consisting of each of the foregoing ranges in the immediately preceding sentence.

Aspect 10. A method of making the semiconductive composite material of any one of aspects 1 to 9, the method comprising mixing the (B) ultra-low-wettability carbon black (ULW-CB) into a melt of the (A) non-polar polyolefin polymer (e.g., non-polar ethylene-based polymer) and (AA) polar ethylene-based copolymer to give the semiconductive composite material as a melt blend comprising constituents (A), (AA), and (B). In some aspects the method further comprises mixing one or more additives (e.g., one or more of the constituents (C) to (K)) into the melt of (A) and (AA). The method may also comprises extruding the melt blend to give an extrudate of the semiconductive composite material. In some aspects the method further comprises allowing the melt blend or extrudate to cool to give a solid blend or a solid extrudate, respectively.

Aspect 11. A crosslinked polyethylene product that is a product of curing the semiconductive composite material of any one of aspects 1 to 9. In some aspects the semiconductive composite material is to be cured and further comprises from 0.1 to 3 wt % of the (E) organic peroxide and no more than 98.80 wt % or 98.75 wt %, respectively, of a combination of the (A) non-polar polyolefin polymer (e.g., non-polar ethylene-based polymer) and (AA) polar ethylene-based copolymer.

Aspect 12. A manufactured article comprising a shaped form of the semiconductive composite material of any one of aspects 1 to 9 or made by the method of aspect 10, or the crosslinked polyethylene product of aspect 11. The shaped form of the manufactured article may cylindrical, helical, or irregular. In some aspects the manufactured article may be a semiconductive layer of an electrical conductor device of aspect 13 (below). In some aspects the manufactured article may be the electrical conductor device of aspect 13.

Aspect 13. An electrical conductor device comprising a conductive core and a semiconductive layer at least partially covering the conductive core, wherein at least a portion of the semiconductive layer comprises the semiconductive composite material of any one of aspects 1 to 9 or made by the method of aspect 10, or the crosslinked polyethylene product of aspect 11. The amount of the semiconductive composite material in the semiconductive layer of the electrical conductor device may be a quantity that is effective for providing electrical conductivity to dissipate electrical charges when the semiconductive composite material is used as shield layer (conductor or strand shield; insulation shield) and protective jacket in electrical power transmitting/distributing cable, including low, medium, high and ultra-high voltage. The effective amount may be a quantity sufficient for the semiconductive composite material to achieve a volume resistivity of less than 100,000 Ohm-cm, alternatively from greater than 0 to less than 100,000 Ohm-cm, alternatively from >0 to less than 50,000 Ohm-cm. The semiconductive layer may be composed of a single layer, at least a portion of which is the inventive composite material or product; or composed of multiple layers, at least one layer of which comprises the inventive composite material or product. The electrical conductor device may be a coated wire or a power cable. The electrical conductor device is useful for electricity-transmitting/distributing applications, including low, medium, high, and ultra-high voltage applications.

Aspect 14. A method of conducting electricity, the method comprising applying a voltage across the conductive core of the electrical conductor device of aspect 13 so as to generate a flow of electricity through the conductive core. The applied voltage may be low (>0 to <5 kilovolts (kV)), medium (5 to <69 kV), high (69 to 230 kV), or extra-high (>230 kV).

Aspect 15. A thermally cycled semiconductive composite material made by subjecting the semiconductive composite material of any one of aspects 1 to 9 to a thermal cycle comprising heating the semiconductive composite material to from 170° to 190° C. for 1 to 5 minutes, and then cooling to 30° C. to give a cooled, thermally cycled semiconductive composite material. Optionally, the heating step may be repeated 1 or more times on the cooled thermally cycled semiconductive composite material. An example of thermal cycling is described later in the Thermal Cycling Test Method.

The non-polar polyolefin polymer of any one of the preceding aspects may be a non-polar ethylene-based polymer, alternatively a non-polar propylene-based polymer, alternatively a blend of the non-polar ethylene-based polymer and the non-polar propylene-based polymer.

"Consisting essentially of" in context of the semiconductive composite material means the semiconductive composite material contains less than 5.0 wt % of, alternatively less than 1.0 wt % of, alternatively is free of (i.e., does not contain any added or detectable amount of, e.g., 0.0 wt %) a polar organic copolymer other than the (AA) polar ethylene-based copolymer and contains less than 5.0 wt % of, alternatively less than 1.0 wt % of, alternatively is free of (i.e., does not contain any added or detectable amount of, e.g., 0.0 wt %) a non-polar organic polymer other than the (A) non-polar polyolefin polymer. The semiconductive composite material may also be free of a polar organic homopolymer (e.g., a polyester or polyamide). For example, the semiconductive composite material is free of a polar organic copolymer wherein at least one of the monomer and comonomer(s) contains per molecule a halogen atom (e.g., F, Cl, Br, or I) and/or a carbon-bonded heteroatom group such as C—O (of an alcohol group), C—O—C (of an epoxide, or ether group), C═O (of an aldehyde or ketone group), C(═O)—O (of a carboxylic acid group), C(═O)—N (of a carboxamide group), N—C(═O)—N (of a urea group), C—N (of an amine group), C═N (of an imine or oxime group), C(═N)—N (of an amidine group), N—C (═N)—N (of an guanidine group), C≡N (of a nitrile group), C(═O)—S (of a thiocarboxylic acid or ester group), C—S (of a mercaptan group), C—S—C (of a sulfide group), or collection of such macromolecules. In some embodiments the semiconductive composite material is also free of a poly(vinylarene) such as a polystyrene.

"Polymer" means homopolymer or copolymer. A homopolymer is a macromolecule composed of monomeric units derived from only one monomer and no comonomer. A copolymer is a macromolecule having monomeric units and comonomeric units, wherein the monomeric units are made by polymerizing a first monomer, and the comonomeric units are made by polymerizing one or more different second or more monomers, referred to as comonomers. Polymer also includes a collection of such macromolecules. Monomers and comonomers are polymerizable molecules. A monomeric unit, also called a monomer unit or "mer", is the largest constitutional unit contributed by (derived from) a single monomer molecule to the structure of the macromolecule(s). A comonomeric unit, also called a comonomer unit or "comer", is the largest constitutional unit contributed by (derived from) a single comonomer molecule to the structure of the macromolecule(s). Each unit is typically divalent. A "bipolymer" is a copolymer made from a monomer and one comonomer. A "terpolymer" is a copolymer made from a monomer and two different comonomers. An ethylenic-based copolymer is such a copolymer wherein the monomeric units are derived from the monomer ethylene ($CH_2$═$CH_2$) and comprise on average per molecule, at least 50 weight percent, and the comonomeric units are derived from one or more comonomers described herein and comprise on average per molecule, from >0 to at most 50 weight percent, of the macromolecules.

"Curing" and "crosslinking" are used interchangeably herein to mean forming a crosslinked product (network polymer).

"Electrical conducting effective amount" means the quantity of the ultra-low-wettability carbon black in the semiconductive composite material is sufficient to exceed the percolation threshold thereof. That is, the quantity of the ultra-low-wettability carbon black is enough by itself to enable electrical conduction through the semiconductive composite material via the ULW-CB. In a semiconductive layer disposed over an electrical conductor, the semiconductive composite material with an electrical conducting effective amount would achieve the volume resistivity of less than 100,000 Ohm-cm.

Unless specifically stated otherwise, "log(volume resistivity)" in log(Ohm-cm) is measured on a sample that experienced no thermal cycling. It is sometimes written as "log(volume resistivity) (no thermal cycling)". To remove all doubt, the log(Ohm-cm) values expressed in the numbered aspects and claims are log(volume resistivity) (no thermal cycling) values.

"(Meth)acrylate" includes acrylate, methacrylate, and a combination thereof. The (meth)acrylate may be unsubstituted.

"Polar organic copolymer": a macromolecule prepared from a monomer and 0, 1 or more comonomers, wherein at least one of the monomer and comonomer(s) contains per molecule a halogen atom (e.g., F, Cl, Br, or I) and/or a carbon-bonded heteroatom group such as C—O (of an alcohol group), C—O—C (of an epoxide, or ether group), C=O (of an aldehyde or ketone group), C(=O)—O (of a carboxylic acid or ester group), C(=O)—N (of a carboxamide group), N—C(=O)—N (of a urea group), C—N (of an amine group), C=N (of an imine or oxime group), C(=N)—N (of an amidine group), N—C(=N)—N (of an guanidine group), C≡N (of a nitrile group), C(=O)—S (of a thiocarboxylic acid or ester group), C—S (of a mercaptan group), C—S—C (of a sulfide group), or collection of such macromolecules.

"Profile": a representation of information in quantified form relating to particular characteristics of something.

The semiconductive composite material. Comprising, or consisting essentially of, a single non-polar polymer that is constituent (A), a single polar polymer that is constituent (AA), and containing a percolation-effective loading of the (B) ultra-low-wettability carbon black (ULW-CB). The composite material may optionally comprise, or consist essentially of, zero, one or more of additives, such as additives (C) to (K). The total weight of the semiconductive composite material is 100.00 wt %.

The semiconductive composite material may be made by a number of different ways. In some aspects the semiconductive composite material may be made by mixing a melt of the (A) non-polar polyolefin polymer (e.g., non-polar ethylene-based or propylene-based polymer) and (AA) polar ethylene-based copolymer with the (B) ultra-low-wettability carbon black (ULW-CB), and any optional constituents (e.g., any zero, one or more of constituents (C) to (K)) to give the semiconductive composite material as an admixture of constituents (A), (AA), (B), and any optional constituents. The mixing may comprise compounding, kneading, or extruding. To facilitate mixing one or more constituents (e.g., (B), additives (C), (D), (E), etc.) may be provided in the form of an additive masterbatch in a portion of (A) or (AA) or as a dispersion in a non-polar carrier resin other than (A). The non-polar carrier resin may be a polypropylene polymer.

Another way the semiconductive composite material containing one or more optional constituents, such as additives (C) to (K), may be made is by making an unmelted form of a semiconductive composite material consisting of (A), (AA), and (B) ultra-low-wettability carbon black (ULW-CB), such as in pellets form, and contacting the unmelted form with the optional constituents. The contacting may comprise soaking, imbibing or injecting. The contacting may be carried out at a temperature from about 20° to 100° C. for 0.1 to 100 hours, e.g., 60° to 80° C. for 0.1 to 24 hours.

The semiconductive composite material may be prepared as a one-part formulation, alternatively a multi-part formulation such as a two-part formulation, alternatively a three-part formulation. The one-part formulation contains all the constituents of the embodiment of the semiconductive composite material. The multi-part formulation contains multiple parts with different ones or amounts of the constituents of the embodiment of the semiconductive composite material in different parts. If desired, the different parts of the multi-part formulation may be combined to give the one-part formulation. There is no inherent reason why any combination of constituents cannot be included in either part or parts of these formulations.

The semiconductive composite material may be in a divided solid form or in continuous form. The divided solid form may comprise granules, pellets, powder, or a combination of any two or more thereof. The continuous form may be a molded part (e.g., blow molded part) or an extruded part (e.g., an insulation layer of an electrical conductor device). The semiconductive composite material may be crosslinkable by irradiation curing or organic peroxide/heat curing. If desired the semiconductive composite material may be cooled to a storage temperature (e.g., 23° C.) and stored for a period of time of 1 hour, 1 week, 1 month, or longer.

The constituent (A) non-polar polyolefin polymer (e.g., non-polar ethylene-based or propylene-based polymer). The (A) non-polar polyolefin polymer may be a single-component non-polar ethylene-based or propylene-based polymer (having a unimodal molecular weight distribution) or a blend of two or more such non-polar polyolefin polymers. Each (A) non-polar polyolefin polymer may be a single phase or multiphase (e.g., an amorphous phase and a crystalline phase) material, crosslinkable or crosslinked (cured). Copolymer includes bipolymers, terpolymers, etc.

The (A) non-polar polyolefin polymer may be a polyethylene homopolymer containing 99 to 100 wt % ethylenic monomeric units. The polyethylene homopolymer may be high density polyethylene (HDPE) homopolymer made by coordination polymerization or a low density polyethylene (LDPE) homopolymer made by radical polymerization.

Alternatively, the (A) non-polar polyolefin polymer may be an ethylene/alpha-olefin copolymer containing 50 to <100 wt % ethylenic monomeric units and 50 to 0 wt % ($C_3$-$C_{20}$)alpha-olefin-derived comonomeric units. The ethylene/alpha-olefin copolymer embodiment of (A) may be a linear low density polyethylene (LLDPE), medium density polyethylene (MDPE), or high density polyethylene (HDPE). Alternatively, the polyethylene polymer may be a low density polyethylene (LDPE). The ethylene/alpha-olefin ("α-olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an alpha-olefin content of less than 50 wt %, less than 45 wt %, less than 40 wt %, or less than 35 wt % based on the entire interpolymer weight. Illustrative ethylene/α-olefin interpolymers are ethylene/propylene, ethylene/1-butene, ethylene/1-hexene, ethylene/1-octene, ethylene/diene containing from 20 to 1 wt % diene comonomeric units, ethylene/propylene/1-octene, ethylene/propylene/1-butene, ethylene/1-butene/1-octene, ethylene/propylene/diene (EPDM) containing 50 to 100 wt % ethylene monomeric units, 49 to >0 wt % of propylene comonomeric units, and 20 to 1 wt % diene comonomeric units. The diene used to make the diene comonomeric units in the ethylene/diene copolymer or in EPDM independently may be 1,3-butadiene, 1,5-hexadiene, 1,7-octadiene, ethylidene norbornene, dicyclopentadiene, vinyl norbornene, or a combination of any two or more thereof.

The ($C_3$-$C_{20}$)alpha-olefin of the ethylene/alpha-olefin copolymer aspect of the (A) non-polar polyolefin polymer (e.g., non-polar ethylene-based or propylene-based polymer) may be a compound of formula (I): $H_2C=C(H)$—R (I), wherein R is a straight chain ($C_1$-$C_{18}$)alkyl group. ($C_1$-$C_{18}$)alkyl group is a monovalent unsubstituted olefin having from 1 to 18 carbon atoms. Examples of R groups are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the ($C_3$-$C_{20}$)alpha-olefin is 1-propene, 1-butene, 1-hexene, or 1-octene; alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene. Alternatively, the alpha-olefin may have a cyclic structure such as cyclohexane or cyclopentane, resulting in an α-olefin such as 3-cyclohexyl-1-propene (allyl cyclohexane) and vinyl cyclohexane. The ($C_3$-$C_{20}$)alpha-olefin may be used as a comonomer or monomer.

Alternatively, the (A) non-polar polyolefin polymer may be the ethylene/olefin-functional silane copolymer. The olefin-functional silane comonomer used to make the ethylene/olefin-functional silane copolymer may be the hydrolyzable silane monomer of paragraph [0019] of WO 2016/200600 A1 (PCT/US16/033879 filed May 24, 2016) to Chaudhary; or of U.S. Pat. No. 5,266,627 to Meverden et al. The olefin-functional hydrolyzable silane may be grafted (post-reactor) onto the copolymer embodiment of the (A). Alternatively, the olefin-functional hydrolyzable silane may be copolymerized with ethylene and the comonomer to directly make the copolymer embodiment containing hydrolyzable silyl groups. In some aspects the olefin-functional hydrolyzable silane is vinyltrimethoxysilane (VTMS), vinyltriethoxysilane (VTES), vinyltriacetoxysilane, or gamma-(meth)acryloxy propyl trimethoxy silane and the hydrolyzable silyl groups are 2-trimethoxysilylethyl, 2-triethoxysilylethyl, 2-triacetoxysilylethyl, or 3-trimethoxysilylpropyloxycarbonylethyl or 3-trimethoxysilylpropyloxycarbonylpropyl.

The (A) non-polar polyolefin polymer may be a blend of two or more different (A) non-polar polyolefin polymers (e.g., non-polar ethylene-based and/or propylene-based polymers) or a reactor product of polymerization reactions with two or more different catalysts. The (A) non-polar polyolefin polymer may be made in two or more reactors, such as the non-polar ethylene-based polymers, ELITE™ polymers, from The Dow Chemical Company.

The (A) non-polar polyolefin polymer (e.g., non-polar ethylene-based or propylene-based polymer) may be made by any suitable process, many of which are known. Any conventional or hereafter discovered process for producing polyethylene polymers may be used to prepare the (A). Typically the production process comprises one or more polymerization reactions. For example, the LDPE may be prepared using a high pressure polymerization process. Alternatively, the LDPE may be prepared using a coordination polymerization process conducted using one or more polymerization catalysts such as Ziegler-Natta, chromium oxide, metallocene, post-metallocene catalysts. Suitable temperatures are from 0° to 250° C., or 30° or 200° C. Suitable pressures are from atmospheric pressure (101 kPa) to 10,000 atmospheres (approximately 1,013 MegaPascals ("MPa")). In most polymerization reactions, the molar ratio of catalyst to polymerizable olefins (monomer/comonomer) employed is from $10^{-12}$:1 to $10^{-1}$:1, or from $10^{-9}$:1 to $10^{-5}$:1.

The amount of the (A) non-polar polyolefin polymer (e.g., non-polar ethylene-based or propylene-based polymer) may be from 35 to 94 wt %, alternatively from 40 to 65 wt %, alternatively from 45 to 55 wt % of the total weight of the semiconductive composite material.

The (AA) polar ethylene-based copolymer. The (AA) polar ethylene-based polymer may be an ethylene/unsaturated carboxylic ester copolymer comprising ethylenic monomeric units and unsaturated carboxylic ester (or acid) comonomeric units. The proportion of the unsaturated carboxylic ester comonomeric units in the (AA) polar ethylene-based copolymer may be from 5 to 40 wt %, alternatively from 20 to 35 wt %, alternatively from 25 to 31 wt %, based on weight of the (AA). The ethylenic units may be from 95 to 60 wt %, alternatively from 80 to 65 wt %, alternatively from 75 to 69 wt % of the weight of the (AA). Each unsaturated carboxylic ester comonomer may independently have hydrogen atoms and from 3 to 20 carbon atoms per molecule, i.e., be a ($C_3$-$C_{20}$)unsaturated carboxylic ester comonomer.

The unsaturated carboxylic ester comonomer, from which the unsaturated carboxylic ester comonomeric units of (AA) are derived, may be a vinyl ($C_2$-$C_8$)carboxylate and the ethylene/unsaturated carboxylic ester copolymer is an ethylene-vinyl ($C_2$-$C_8$)carboxylate copolymer. In some aspects the vinyl ($C_2$-$C_8$)carboxylate is a vinyl ester of a carboxylic acid anion having from 2 to 8 carbon atoms, alternatively 2 to 4 carbon atoms. Examples of the vinyl carboxylate esters are mentioned in U.S. Pat. No. 7,767,910 B2, column 2, lines 34 to 50. The vinyl ($C_2$-$C_8$)carboxylate may be a vinyl ($C_2$-$C_4$)carboxylate such as vinyl acetate, vinyl propionate, or vinyl butanoate and the ethylene/unsaturated carboxylic ester copolymer may be an ethylene-vinyl ($C_2$-$C_4$)carboxylate bipolymer, alternatively an ethylene-vinyl acetate (EVA) bipolymer, alternatively an ethylene-vinyl propionate bipolymer, alternatively an ethylene-vinyl butanoate bipolymer. The EVA bipolymer consists essentially of ethylene-derived monomeric units and vinyl acetate-derived comonomeric units. The vinyl acetate comonomeric unit content of the EVA bipolymer may be from 5 to 40 wt %, alternatively from 20 to 35 wt %, alternatively from 25 to 31 wt %, based on weight of the EVA bipolymer. Alternatively or additionally, the (A) (e.g., EVA bipolymer) may have a melt index (190° C., 2.16 kg) of from 2 to 60 g/10 min., alternatively 5 to 40 g/10 min. measured by ASTM D1238-04.

Alternatively, the unsaturated carboxylic ester comonomer, from which the unsaturated carboxylic ester comonomeric units of (AA) are derived, may be an alkyl (meth)acrylate such as a ($C_1$-$C_8$)alkyl (meth)acrylate such as methyl acrylate and methyl methacrylate. The ($C_1$-$C_8$)alkyl (meth)acrylate may be found in an ethylene/unsaturated carboxylic ester copolymer such as an ethylene-($C_1$-$C_8$) alkyl (meth)acrylate copolymer (EAA). In some aspects the ($C_1$-$C_8$)alkyl may be a ($C_1$-$C_4$)alkyl, ($C_5$-$C_8$)alkyl, or ($C_2$-$C_4$)alkyl. The EAA consists essentially of ethylene-derived monomeric units and one or more different types of ($C_1$-$C_8$)alkyl (meth)acrylate-derived comonomeric units such as ethyl acrylate and/or ethyl methacrylate comonomeric units. The ($C_1$-$C_8$)alkyl may be methyl, ethyl, 1,1-dimethylethyl, butyl, or 2-ethylhexyl. The (meth)acrylate may be acrylate, methacrylate, or a combination thereof. The ($C_1$-$C_8$)alkyl (meth)acrylate may be ethyl acrylate and the EAA may be ethylene-ethyl acrylate copolymer (EEA) or the ($C_1$-$C_8$) alkyl (meth)acrylate may be ethyl methacrylate and the EAA may be ethylene-ethyl methacrylate copolymer (EEMA). The ethyl acrylate or ethyl methacrylate comonomeric unit content of EEA or EEMA, respectively, may independently be from 5 to 40 wt %, alternatively from 20 to 35 wt %, alternatively from 25 to 31 wt %, based on weight of the EEA or EEMA bipolymer.

The amount of the (AA) polar ethylene-based polymer may be from 70 to 98.9 wt %, alternatively from 40 to 94 wt %, alternatively from 45 to 60 wt % of the total weight of the semiconductive composite material.

Constituent (B): ultra-low-wettability carbon black (ULW-CB). The ULW-CB is described earlier. The (B) ULW-CB may be from 1.0 to 39 wt %, alternatively from 1.5 to 29 wt %, alternatively from 1.5 to 20.5 wt %, alternatively from 1.5 to 19 wt %, alternatively from 1.5 to 16 wt %, alternatively from 1.5 to 11 wt %, alternatively from 1.5 to 6 wt %, of the semiconductive composite material.

In some aspects the semiconductive composite material may also contain a carbon black other than the (B) ULW-CB. Examples of such other carbon blacks are Printex XE2 carbon black (DeGussa), Black Pearls 1000 carbon black (Cabot Corp.), Vulcan XC 72 carbon black (Cabot Corp.), Ketjenblack EC600JD carbon black (Akzo), Vulcan P carbon black (Cabot Corp.), United 120 carbon black (Cabot Corp.), Denka Black carbon black (Denka), Vulcan XC 500 carbon black, or Acetylene Black AB 100%-01 carbon black (Soltex). In other aspects the (B) ULW-CB does not include any other carbon black.

Constituent (C): plastomer. The (C) plastomer may be a polymer material that combines qualities of elastomers and plastics, such as rubber-like properties, with the processing abilities of plastics. In some aspects the (C) plastomer may also be an embodiment of the (A) non-polar polyolefin polymer (e.g., non-polar ethylene-based or propylene-based polymer). An example of (C) is an ethylene/alpha-olefin copolymer, a linear low density polyethylene (LLDPE) having a density of density of 0.905 g/cm$^3$ and a melt index ($I_2$) (ASTM D1238-04, 190° C., 2.16 kg) of 0.9 g/10 min.), available as DFNA-1477 NT from The Dow Chemical Company. In some aspects the semiconductive composite material and crosslinked polyethylene product is free of (C). When present, the (C) may be 0.01 to 1.5 wt %, alternatively 0.05 to 1.2 wt %, alternatively 0.1 to 1.0 wt % of the semiconductive composite material.

The optional constituent (D) antioxidant. The (D) antioxidant functions to provide antioxidizing properties to the semiconductive composite material and/or peroxide-cured semiconducting product. Examples of suitable (D) are bis(4-(1-methyl-1-phenylethyl)phenyl)amine (e.g., NAUGARD 445); 2,2'-methylene-bis(4-methyl-6-t-butylphenol) (e.g., VANOX MBPC); 2,2'-thiobis(2-t-butyl-5-methylphenol (CAS No. 90-66-4, commercially LOWINOX TBM-6); 2,2'-thiobis(6-t-butyl-4-methylphenol (CAS No. 90-66-4, commercially LOWINOX TBP-6); tris[(4-tert-butyl-3-hydroxy-2,6-dimethylphenyl)methyl]-1,3,5-triazine-2,4,6-trione (e.g., CYANOX 1790); pentaerythritol tetrakis(3-(3,5-bis(1,1-dimethylethyl)-4-hydroxyphenyl) propionate (e.g., IRGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); and distearyl thiodipropionate ("DSTDP"). In some aspects (D) is bis(4-(1-methyl-1-phenylethyl)phenyl)amine (e.g., NAUGARD 445, which is commercially available from Addivant, Danbury, Connecticut, U.S.A.). In some aspects the semiconductive composite and crosslinked polyethylene product is free of (D). When present, the (D) may be 0.01 to 1.5 wt %, alternatively 0.05 to 1.2 wt %, alternatively 0.1 to 1.0 wt % of the semiconductive composite material.

The optional constituent (E): organic peroxide. A molecule containing carbon atoms, hydrogen atoms, and two or more oxygen atoms, and having at least one —O—O— group, with the proviso that when there are more than one —O—O— group, each —O—O— group is bonded indirectly to another —O—O— group via one or more carbon atoms; or collection of such molecules. The (E) organic peroxide may be added to the semiconductive composite material if curing of the semiconductive composite material is desired, especially curing comprising heating the semiconductive composite material comprising constituents (A), (B), and (E) to a temperature at or above the (E) organic peroxide's decomposition temperature. The (E) organic peroxide may be a monoperoxide of formula $R^O$—O—O—$R^O$, wherein each $R^O$ independently is a ($C_1$-$C_{20}$)alkyl group or ($C_6$-$C_{20}$)aryl group. Each ($C_1$-$C_{20}$)alkyl group independently is unsubstituted or substituted with 1 or 2 ($C_6$-$C_{12}$) aryl groups. Each ($C_6$-$C_{20}$)aryl group is unsubstituted or substituted with 1 to 4 ($C_1$-$C_{10}$)alkyl groups. Alternatively, the (E) may be a diperoxide of formula $R^O$—O—O—R—O—O—$R^O$, wherein R is a divalent hydrocarbon group such as a ($C_2$-$C_{10}$)alkylene, ($C_3$-$C_{10}$)cycloalkylene, or phenylene, and each $R^O$ is as defined above. The (E) organic peroxide may be bis(1,1-dimethylethyl) peroxide; bis(1,1-dimethylpropyl) peroxide; 2,5-dimethyl-2,5-bis(1,1-dimethylethylperoxy) hexane; 2,5-dimethyl-2,5-bis(1,1-dimethylethylperoxy) hexyne; 4,4-bis(1,1-dimethylethylperoxy) valeric acid; butyl ester; 1,1-bis(1,1-dimethylethylperoxy)-3,3,5-trimethylcyclohexane; benzoyl peroxide; tert-butyl peroxybenzoate; di-tert-amyl peroxide ("DTAP"); bis(alpha-t-butyl-peroxyisopropyl) benzene ("BIPB"); isopropylcumyl t-butyl peroxide; t-butylcumylperoxide; di-t-butyl peroxide; 2,5-bis (t-butylperoxy)-2,5-dimethylhexane; 2,5-bis(t-butylperoxy)-2,5-dimethylhexyne-3,1,1-bis(t-butylperoxy)-3,3,5-trimethylcyclohexane; isopropylcumyl cumylperoxide; butyl 4,4-di(tert-butylperoxy) valerate; or di(isopropylcumyl) peroxide; or dicumyl peroxide. The (E) organic peroxide may be dicumyl peroxide. In some aspects only a blend of two or more (E) organic peroxides is used, e.g., a 20:80 (wt/wt) blend of t-butyl cumyl peroxide and bis(t-butyl peroxy isopropyl)benzene (e.g., LUPEROX D4466, which is commercially available from Arkema). In some aspects at least one, alternatively each (E) organic peroxide contains one —O—O— group. In some aspects the semiconductive composite material and crosslinked polyethylene product is free of (E). When present, the (E) organic peroxide may be 0.05 to 3.0 wt %, alternatively 0.1 to 3 wt %, alternatively 0.5 to 2.5 wt % of the semiconductive composite material. Typically when the semiconductive composite material further comprises both the (D) antioxidant and (E) organic peroxide, the weight/weight ratio of (D) antioxidant to (E) organic peroxide is less than 2 ((D)/(E) (wt/wt)<2).

The optional constituent (F) scorch retardant. A molecule that inhibits premature curing, or a collection of such molecules. Examples of a scorch retardant are hindered phenols; semi-hindered phenols; TEMPO; TEMPO derivatives; 1,1-diphenylethylene; 2,4-diphenyl-4-methyl-1-pentene (also known as alpha-methyl styrene dimer or AMSD); and allyl-containing compounds described in U.S. 62/779, 2561, column 2, line 62, to column 3, line 46. In some aspects the semiconductive composite material and crosslinked polyethylene product is free of (K). When present, the (K) scorch retardant may be from 0.01 to 1.5 wt %, alternatively 0.05 to 1.2 wt %, alternatively 0.1 to 1.0 wt % of the semiconductive composite material.

The optional constituent (G) alkenyl-functional coagent. A molecule that contains a backbone or ring substructure and one, alternatively two or more propenyl, acrylate, and/or vinyl groups bonded thereto, wherein the substructure is composed of carbon atoms and optionally nitrogen atoms, or a collection of such molecules. The (D) conventional coagent may be free of silicon atoms. The (G) alkenyl-functional coagent may be a propenyl-functional conventional coagent as described by any one of limitations (i) to (v): (i) (G) is 2-allylphenyl allyl ether; 4-isopropenyl-2,6-dimethylphenyl allyl ether; 2,6-dimethyl-4-allylphenyl allyl ether; 2-methoxy-4-allylphenyl allyl ether; 2,2'-diallyl bisphenol A; O,O'-diallyl bisphenol A; or tetramethyl diallyl-bisphenol A; (ii) (G) is 2,4-diphenyl-4-methyl-1-pentene or 1,3-diisopropenylbenzene; (iii) (G) is triallyl isocyanurate ("TAIC"); triallyl cyanurate ("TAC"); triallyl trimellitate ("TATM"); N,N,N',N',N'',N''-hexaallyl-1,3,5-triazine-2,4,6-triamine ("HATATA"; also known as $N^2,N^2,N^4,N^4,N^6,N^6$-hexaallyl-1,3,5-triazine-2,4,6-triamine); triallyl orthoformate; pentaerythritol triallyl ether; triallyl citrate; or triallyl aconitate; (iv) (G) is a mixture of any two of the propenyl-functional coagents in (i). Alternatively, the (G) may be an acrylate-functional conventional coagent selected from trimethylolpropane triacrylate ("TMPTA"), trimethylolpropane trimethylacrylate ("TMPTMA"), ethoxylated bisphenol A dimethacrylate, 1,6-hexanediol diacrylate, pentaerythritol tetraacrylate, dipentaerythritol pentaacrylate, tris(2-hydroxyethyl) isocyanurate triacrylate, and propoxylated glyceryl triacrylate. Alternatively, the (G) may be a vinyl-functional conventional coagent selected from polybutadiene having at least 50 wt % 1,2-vinyl content and trivinyl cyclohexane ("TVCH"). Alternatively, the (G) may be a conventional coagent described in U.S. Pat. No. 5,346,961 or 4,018,852. Alternatively, the (G) may be a combination or any two or more of the foregoing coagents. In some aspects the semiconductive composite material and crosslinked polyethylene product is free of (G). When present, the (G) coagent may be 0.01 to 4.5 wt %, alternatively 0.05 to 2 wt %, alternatively 0.1 to 1 wt %, alternatively 0.2 to 0.5 wt % of the semiconductive composite material.

The optional constituent (H) nucleating agent. An organic or inorganic additive that that enhances the rate of crystallization of a polyethylene polymer. Examples of (H) are calcium carbonate, titanium dioxide, barium sulfate, ultra high-molecular-weight polyethylene, potassium hydrogen phthalate, benzoic acid compounds, sodium benzoate compounds, disodium bicyclo[2.2.1]heptane-2,3-dicarboxylate, zinc monoglycerolate, and 1,2-cyclohexanedicarboxylic acid, calcium salt:zinc stearate. In some aspects the semiconductive composite material and crosslinked polyethylene product is free of (H). When present, the (H) may be in a concentration of from 0.01 to 1.5 wt %, alternatively 0.05 to 1.2 wt %, alternatively 0.1 to 1.0 wt % of the semiconductive composite material.

The optional constituent (I) processing aid. Examples of (I) are fluoroelastomers and Viton FreeFlow processing aids, such as Viton FreeFlow 23, from The Chemours Company, Wilmington, Delaware, USA.

The optional constituent (J) extender oil. Examples of (J) are mineral oils, paraffin oil, and combinations thereof.

The optional constituent (K) stabilizer. A particulate solid having an average particle size of 18 to 22 nanometers (nm). (K) may be hydrophobized fumed silica such as those commercially available under the CAB-O-SIL trade name from Cabot Corporation. The (K) may be a UV stabilizer that may also have flame retardant effects.

The semiconductive composite material independently may not, alternatively may further consist essentially of 0.005 to 0.5 wt % each of one or more optional additives selected from a carrier resin, a corrosion inhibitor (e.g., $SnSO_4$), a lubricant, an anti-blocking agent, an anti-static agent, a slip agent, a plasticizer, a tackifier, a surfactant, an acid scavenger, a voltage stabilizer, and a metal deactivator.

The optional additives may be used to impart to either to the inventive semiconductive composite material and/or to the inventive product one or more beneficial properties. In some aspects any one of the optional constituents or additives is that used later in the Examples.

The electrical conductor device: coated metal wire, electrical cable, or power cable, such as for use in low, medium, high and extra-high voltage electricity-transmitting applications. A "wire" means a single strand or filament of conductive material, e.g., conductive metal such as copper or aluminum, or a single strand or filament of optical fiber. A "power cable" comprises at least one wire disposed within a semiconductive layer and a covering that may be referred to as an insulation layer. The electrical conductor device may be designed and constructed for use in medium, high, or extra-high voltage applications. Examples of suitable cable designs are shown in U.S. Pat. Nos. 5,246,783; 6,496,629; and 6,714,707.

The electrical conductor device may contain, from inside out, a conductive core, an inner semiconductive layer, and, optionally, an inner insulation layer. The optional insulated aspect of the electrical conductor device may contain an outer semiconductive layer and an outer insulation layer. The conductive core may be composed of one or more metal wires. When the conductive core is "stranded", it contains two or more metal wires, which may be sub-divided into discrete wire bundles. Each wire in the conductive core, whether bundled or not, may be individually coated with an insulation layer and/or the discrete bundles may be coated with an insulation layer. Each insulation layer independently may be a single layer or multilayer covering, coating or sheath. The insulation layer(s) primarily function(s) to protect or insulate the conductive core and semiconductive layer(s) from external environments such as sunlight, water, heat, oxygen, other conductive materials (e.g., to prevent short-circuiting), and/or corrosive materials (e.g., chemical fumes).

The single layer or multilayer covering from one insulated electrical conductor device to the next may be configured differently depending upon their respective intended uses. For example, viewed in cross-section, the multilayer covering of the insulated electrical conductor device may be configured sequentially from its innermost layer to its outermost layer with the following components: an inner semiconducting layer (in physical contact with the conductive core), an insulation layer comprising the crosslinked polyethylene product (inventive crosslinked product), an outer semiconducting layer, a metal shield, and a protective sheath. The layers and sheath are circumferentially and coaxially (longitudinally) continuous. The metal shield (ground) is coaxially continuous, and circumferentially either continuous (a layer) or discontinuous (tape or wire). The outer semiconducting layer, when present, may be composed of a peroxide-crosslinked semiconducting product that may be strippable from the insulation layer.

The method of conducting electricity. The inventive method of conducting electricity may use the electrical conductor device or may use a different electrical conductor device that includes the inventive semiconductive composite material or product.

The electrical conductor device is useful for data-transmitting applications and/or for electricity-transmitting applications, including low, medium, high, and ultra-high voltage applications.

The inventive semiconductive composite material and product are useful in a variety of other applications including in containers, vehicle parts, and electronics packaging.

A compound includes all its isotopes and natural abundance and isotopically-enriched forms. The enriched forms may have medical or anti-counterfeiting uses.

In some aspects any compound, composition, formulation, material, mixture, or reaction product herein may be free of any one of the chemical elements selected from the group consisting of: H, Li, Be, B, C, N, O, F, Na, Mg, Al, Si, P, S, CI, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, material, mixture, or reaction product (e.g., C and H required by a polyethylene or C, H, and O required by an alcohol) are not counted.

The following apply unless indicated otherwise. Alternatively precedes a distinct embodiment. AEIC means Association of Edison Illuminating Companies, Birmingham, Alabama, USA. ASTM means the standards organization, ASTM International, West Conshohocken, Pennsylvania, USA. IEC means the standards organization, International Electrotechnical Commission, Geneva, Switzerland. ISO means the standards organization, International Organization for Standardization, Geneva, Switzerland. Any comparative example is used for illustration purposes only and shall not be prior art. Free of or lacks means a complete absence of; alternatively not detectable. ICEA means Insulated Cable Engineers Association and standards promulgated by IHS Markit, London, England. IUPAC is International Union of Pure and Applied Chemistry (IUPAC Secretariat, Research Triangle Park, North Carolina, USA). May confers a permitted choice, not an imperative. Operative means functionally capable or effective. Optional(ly) means is absent (or excluded), alternatively is present (or included). Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature: 23° C.±1° C. Substituted when referring to a compound means having, in place of hydrogen, one or more substituents, up to and including per substitution.

Semiconductive Composite Material Preparation Method: prepare an embodiment of the semiconductive composite material consisting essentially of 67 wt % of the (A) non-polar polyolefin polymer (e.g., non-polar ethylene-based polymer) and 33 wt % of the (B) ULW-CB by melt-mixing (A) and (B) at a mixing speed of 50 rotations per minute (rpm) for 20 minutes at 160° C. using a C. W. Brabender prep-mixer to give a concentrated masterbatch of (A) and (B). These melt-mixing conditions are well-suited for use when (A) is a non-polar ethylene-based polymer. The conditions may be adjusted to ensure proper melt-mixing of other embodiments of (A) such as the non-polar propylene-based polymer such as using a higher temperature (e.g., 200° C.). The concentrated masterbatch of (A) and (B) may be melt-mixed with a melt of the (AA) polar organic copolymer to give embodiments of the semiconductive composite material. comprising (A), (AA), and (B) If desired, melt mix the concentrated masterbatch or the embodiment of the semiconductive composite material with additional independently chosen (A) non-polar polyolefin polymer (e.g., non-polar ethylene-based or propylene-based polymer), which may be the same or different than the (A) of the concentrated masterbatch, to give other embodiments of the semiconductive composite material having a concentration of the (B) ULW-CB from >0 to <33 wt %.

Pellets Preparation Method. Compound the semiconductive composite material prepared by the Semiconductive Composite Material Preparation Method into a hopper of a Brabender single screw extruder, and extrude a melt of the semiconductive composite material at 120° C. with a screw speed of 25 rpm to give the semiconductive composite material as a melt strand. These extruding and stranding conditions are well-suited for use when (A) is a non-polar ethylene-based polymer. The conditions may be adjusted to ensure proper extruding and stranding of other embodiments of (A) such as the non-polar propylene-based polymer such as using a higher temperature (e.g., 200° C.). Feed the melt strand into a Brabender Pelletizer to give the second inventive semiconductive composite material in the form of pellets.

Soaking Method. Add 50 grams (g) of the pellets of the second inventive semiconductive composite material prepared in the Pellets Preparation Method and 0.865 g of (E) organic peroxide into a 250 milliliter volume, fluorinated high density polyethylene (F-HDPE) bottle. Seal the bottle containing the pellets and (E) tightly. Allow the (E) organic peroxide to soak into the pellets at 70° C. for 8 hours, shaking the sealed bottle at 0, 2, 5, 10, 20, and 30 minutes, to give a third inventive semiconductive composite material as organic peroxide-soaked pellets. Store the organic peroxide-soaked pellets in the F-HDPE bottle at 23° C. until needed for testing.

Crosslinked Polyethylene Product and Compression Molded Plaque Preparation Method 1: Prepares compression molded plaques of crosslinked polyethylene product for dissipation factor testing. Sandwich 15 g of the organic peroxide-soaked pellets prepared by Soaking Method 1 between two 2-millimeter (mm) thick poly(ethylene terephthalate) films to give a sandwich. Place the sandwich into a mold having the following dimensions: 180 mm×190 mm×0.5 mm. Place the mold containing the sandwich between upper and lower plates of a hot press machine and mold at 120° C. and 0 megapascals (MPa) applied pressure for 10 minutes to give a preheated mold. Hold the mold at 120 C. under 5 MPa for 0.5 minute, then at 120 C. under 10 MPa for 0.5 minute. Vent the mold 8 times, then hold the mold at 180° C. under 10 MPa pressure for approximately 13 minutes to give additional curing to give a crosslinked polyethylene product. Cool the mold from 180° to 25° C. under 10 MPa within 10 minutes, and remove the crosslinked polyethylene product, which is in the form of a compression-molded plaque. Test dissipation factor according to the below method.

Compression Molded Plaque Preparation Method: place a virgin sample of a material (e.g., (A) non-polar polyolefin polymer (e.g., non-polar ethylene-based or propylene-based polymer) or (AA) polar organic polymer), a combination of (A) and (AA), or semiconductive composite material) in a mold, and press in a Grenerd hydraulic press as follows: preheat the press to 150° C.; then heat sample in mold without pressure for 3 minutes to give heated sample; press heated sample at 0.689 megapascals (MPa, 100 pounds per square inch (psi)) pressure for 3 minutes and then press at 17.2 MPa (2500 psi) pressure for 3 minutes; quench the mold and keep it at 40° C. for 3 minutes at 0.689 MPa pressure to give compression molded plaque of the sample.

BET Nitrogen Surface Area Test Method: Perform BET surface area analysis using a Micromeritics Accelerated Surface Area & Porosimetry instrument (ASAP 2420). Outgas samples at 250° C. while under vacuum prior to analysis. The instrument employs a static (volumetric) method of dosing samples and measures the quantity of gas that can be physically adsorbed (physisorbed) on a solid at liquid nitrogen temperature. For a multi-point BET measurement measure the volume of nitrogen uptake at pre-selected relative pressure points at constant temperature. The relative pressure is the ratio of the applied nitrogen pressure to the vapor pressure of nitrogen at the analysis temperature of −196° C.

Density Test Method: measured according to ASTM D792-13, Standard Test Methods for Density and Specific Gravity (Relative Density) of Plastics by Displacement, Method B (for testing solid plastics in liquids other than water, e.g., in liquid 2-propanol). Report results in units of grams per cubic centimeter (g/cm³).

Melt index (190° C., 2.16 kilograms (kg), "$I_2$") Test Method: for non-polar ethylene-based polymer is measured according to ASTM D1238-04, Standard Test Method for Melt Flow Rates of Thermoplastics by Extrusion Platometer, using conditions of 190° C./2.16 kilograms (kg), formerly known as "Condition E" and also known as $I_2$. Report results in units of grams eluted per 10 minutes (g/10 min.). Replicate for non-polar propylene-based polymers except use 230° C. instead of 190° C.

Moisture Uptake Test Method: measure moisture uptake of carbon blacks by drying a carbon black sample in a vacuum oven at 100° C. overnight, measuring the weight of the dried carbon black sample, placing the dried carbon black sample inside a chamber with well-controlled 80% relative humidity (RH) and temperature 24° C. for 24 hours to give a humidified carbon black sample, weighing the humidified carbon black sample, and calculating the amount of moisture uptake in weight parts per million using the following equation: amount moisture uptake=(weight of humidified CB sample−weight of dried CB sample) divided by weight of dried CB sample.

Oil Absorption Number (OAN) Test Method: use ASTM D2414-04, Procedure A with dibutyl phthalate (DBP).

Phase Morphology Test Method: characterize phase morphology of semiconductive composite material using scanning electron microscopy (SEM). To prepare for the analysis, first cut open a compression molded plaque sample, prepared by the Compression Molded Plaque Preparation Method, using a razor blade to expose its interior. Polish the exposed interior in a Leica Ultracut EM FC7 cryo-ultramicrotome at −80° C. Acquire electron micrographs in a FEI Nova NanoSEM 630 electron microscope equipped with a zirconiated tungsten field emission electron source operating at 10 kilovolts (kV), an Everhart-Thornley secondary electron detector and a low-voltage high-contrast backscattered electron detector.

Rheology Test Method: viscosity versus angular frequency. Conduct dynamic oscillatory shear rheology with an ARES oscillatory shear rheometer for analysis of viscoelastic behavior. Conduct oscillatory shear measurements with the parallel plate geometry (plate diameter of 25 mm) using frequency sweeps at 0.25% strain for angular frequency from 0.1 to 100 radians per second (rad/s) for strain within the linear viscoelastic region. Perform measurements at 160° C. Report results in pascal-seconds (Pa-s).

Surface Energy Test Method: measure at 23° C. from three liquids contact angles using Owens-Wendt equation. Make a plaque of a sample of the (A) non-polar polyolefin polymer (e.g., non-polar ethylene-based or propylene-based polymer) by Compression Molded Plaque Preparation Method (described earlier). Calculate surface energies of the sample based on liquid contact angles using the OWENS-WENDT method. Measure contact angles by sessile drop on a KRUSS DSA100 Drop Shape Analyzer (goniometer) at brightness=100, contrast=80, and frame rate=50 using manual base line. The three liquids are water, formamide, and diiodomethane and are used from the turret setup with 0.5 millimeter (mm) stainless steel/polymer needles. Fit contact angles using the Ellipse (Tangent 1) method. Analyze at least 6 drops for each liquid, and report the average of the results. Use averages to calculate surface energy by the OWENS-WENDT method.

Thermal Cycling Test Method: heat a sample of semiconductive composite material in a copper mold (placed inside a hydraulic press) at 180° C. for 3 minutes without pressure, followed by 3 minutes under a pressure of 0.689 MPa (100 psi) and 3 minutes under pressure of 17.2 MPa (2500 psi). Then quench the sample to 40° C. under a pressure of 0.689 MPa (100 psi). Repeat this thermal cycle two times to give a thermally cycled sample.

Volume Resistivity Test Method: Measure resistivity of two samples of same material with low resistivity (<10⁸ Ohm-cm (Ω·cm)) using a Keithley 2700 Integra Series digital multimeter with 2-point probe. Apply silver paint (conductive silver #4817N) to minimize contact resistance between the samples and electrodes, wherein the sample is a compression molded plaque sample prepared by the Compression Molded Plaque Preparation Method with thickness of 1.905 to 1.203 mm (75 mils to 80 mils), length of 101.6 mm, and width of 50.8 mm. Measure resistivity of samples with high resistivity (>10⁸ Ω·cm) using a Keithley Model 6517B electrometer coupled with a Model 8009 resistivity test chamber using circular disk samples, wherein the sample is a circular disk prepared as a compression molded plaque sample prepared by the Compression Molded Plaque Preparation Method with thickness of 1.905 to 1.203 mm (75 mils to 80 mils) and a diameter of 63.5 mm.

Wettability Test Method: using inverse gas chromatography (IGC) method with an IGC Surface Energy Analyzer instrument and SEA Analysis Software, both from Surface Measurement Systems, Ltd., Allentown, Pennsylvania, USA. The total surface energy (γ(Total)) of a material is the summation of two components, the dispersive component (γ(Dispersive)) and the polar component (γ(Polar)): γ(Total)= γ(Polar)+γ(Dispersive). Measure the γ(Dispersive) component with four alkane gas probes: decane, nonane, octane, and heptane, and determine γ(Dispersive) with the method of Dorris and Gray (see below). Measure the γ(Polar) component with two polar gas probes: ethyl acetate and dichloromethane, and analyze γ(Polar) based on the van Oss approach with the Della Volpe scale (D. J. Burnett et al., AAPS PharmSciTech, 2010, 13, 1511-1517; G. M. Dorris et al. J. Colloid Interface Sci. 1980, 23, 45-60; C. Della Volpe et al., J Colloid Interface Sci, 1997, 195, 121-136). Pack approximately 10 to 20 milligrams (mg) of amounts of a test sample of neat carbon black into individual silanized glass column (300 mm long by 4 mm inner diameter). Precondition the carbon black-packed columns for 2 hours at 100° C. and 0% relative humidity with helium carrier gas to normalize samples. Perform measurements with 10 standard cubic centimeter per minute (sccm) total flow rate of helium, and use methane for dead volume corrections. Measure components at 100° C. and 0% relative humidity. The surface energy of carbon black is measured as a function of surface coverage, $n/n_m$, where n is the sorbed amount of gas probe, $n_m$ is the monolayer capacity of carbon black. The distribution of surface energy as a function of surface coverage reveals the heterogeneity of the carbon black surface.

EXAMPLES

Vulcan XC 500 furnace carbon black from Cabot Corporation. BET Nitrogen surface area 65 m²/g, measured by the BET Nitrogen Surface Area Test Method; OAN 148 mL/100 g, measured by ASTM D2414-04; and moisture uptake 10,000 ppm, measured by the Moisture Uptake Test Method; and a surface wettability profile characterized by wettability=0.0115 at surface coverage of 0.02, and wettability=0.0101 at surface coverage of 0.04, and wettability=0.0099 at surface coverage of 0.06, and wettability=0.0111 at surface coverage of 0.08, and wettability=0.0117 at surface coverage of 0.10.

Acetylene Black AB 100%-01 carbon black from Soltex. BET nitrogen surface area of 77 m$^2$/g, measured by the BET Nitrogen Surface Area Test Method; an OAN of 187 to 202 mL/100 g, measured by ASTM D2414-04; moisture uptake 3,000 ppm, measured by the Moisture Uptake Test Method; and a surface wettability profile characterized by wettability=0.0101 at surface coverage of 0.02, and wettability=0.0108 at surface coverage of 0.04, and wettability=0.0111 at surface coverage of 0.06, and wettability=0.0112 at surface coverage of 0.08, and wettability=0.0113 at surface coverage of 0.10.

Constituent (A1): an (A) non-polar polymer that is a non-polar ethylene-based polymer that is a low density polyethylene (LDPE) having a density of 0.918 gram per cubic centimeter (g/cm$^3$) and a melt index (I$_2$) (ASTM D1238-04, 190° C., 2.16 kg) of 8.0 grams per 10 minutes (g/10 min.). Available as product DOW™ LDPE 722 from The Dow Chemical Company, Midland, Michigan, USA.

Constituent (AA1): an ethylene/vinyl acetate (EVA) copolymer having a vinyl acetate comonomeric unit content of 28 wt %. Available as product ELVAX 260 from DuPont, Wilmington, Delaware, USA.

Constituent (B1): a (B) ULW-CB that is LITX 50 Conductive Additive from Cabot Corporation. BET nitrogen surface area of 56 m$^2$/g, measured by the BET Nitrogen Surface Area Test Method; an OAN of 125 to 145 mL/100 g, measured by ASTM D2414-04; moisture uptake 520 ppm, measured by the Moisture Uptake Test Method; and a surface wettability profile characterized by wettability=0.0014 at surface coverage of 0.02, and wettability=0.0039 at surface coverage of 0.04, and wettability=0.0051 at surface coverage of 0.06, and wettability=0.0061 at surface coverage of 0.08, and wettability=0.0069 at surface coverage of 0.10.

Inventive Example 1 (IE1): inventive semiconductive composite material of 45 wt % (A), 45 wt % (AA), and 10 wt % (B) prepared using constituent (A1) DOW LDPE 722, constituent (AA1) ELVAX 260, and constituent (B1) LITX 50 carbon black. The weight/weight ratio of (A1)/(AA1) is 50/50. Prepare a masterbatch of 200 g (A1) LDPE and 100 g (B1) carbon black by melt-mixing according to the Semiconductive Composite Material Preparation Method. Press the mixed masterbatch of LITX50/LDPE722 (33 wt %/67 wt %) to form a plaque under pressure 0.689 megapascals (MPa, 100 pounds per square inch (psi)) and room temperature in a hydraulic press. Cut the plaque into smaller pieces for future use. Add 22.5 g of the mixed masterbatch, 18.75 g of neat pellets of (A1) LDPE, and 33.75 g of (AA1) ELVAX 260 to a second preparatory mixer at 160° C., and mix for 10 minutes with a motor speed of 50 cycles per minute to give the semiconductive composite material of IE1. Press the material in a Grenerg hydraulic press at room temperature to pre-form a plaque. Press resulting plaque in another hydraulic press, and heat at 150° C. for 3 minutes without pressure, then press the heated sample at 0.689 MPa (100 psi) for 3 minutes, then at 17.2 MPa (2500 psi) pressure for 3 minutes; quench the mold and keep it at 40° C. for 3 minutes at 0.689 MPa pressure to give compression molded plaque 1 of the sample having a thickness of 1.905 mm (75 mils) to give the semiconductive composite material of IE1. Measure electrical resistivity of the plaque 1 according to the Volume Resistivity Test Method.

Inventive Examples 2 to 4 (IE2 to IE4): inventive semiconductive composite materials having a weight/weight ratio of (A1)/(AA1) equal to 50/50 and 7 wt %, 5 wt %, or 2 wt % of the (B1) LITX 50 carbon black. Replicate the procedure of IE1 except use different proportions of the mixed masterbatch, neat pellets of (A1) LDPE, (AA1) ELVAX 260, and (B1) LITX 50 carbon black to give the semiconductive composite materials of IE2 to IE4.

Inventive Example 5 (IE5): inventive semiconductive composite material of 41.9 wt % (A), 51.1 wt % (AA), and 7.0 wt % (B) prepared using constituent (A1) DOW LDPE 722, constituent (AA1) ELVAX 260, and constituent (B1) LITX 50 carbon black. The weight/weight ratio of (A1)/(AA1) is 45/55. Replicate the procedure of IE1 except use 15.75 g of the mixed masterbatch, 18.0 g of neat pellets of (A1) LDPE, and 41.25 g of (AA1) ELVAX 260 to give the semiconductive composite material of IE5.

Inventive Example 6 (IE6): inventive semiconductive composite material having a weight/weight ratio of (A1)/(AA1) equal to 45/55 and 5 wt % of the (B1) LITX 50 carbon black. Replicate the procedure of IE5 except use different proportions of the mixed masterbatch, neat pellets of (A1) LDPE, (AA1) ELVAX 260, and (B1) LITX 50 carbon black to give the semiconductive composite materials of IE6.

Inventive Examples 7 and 8 (IE7 and IE8): inventive semiconductive composite material having weight/weight ratio of (A1)/(AA1) is 40/60 and either 7 wt % or 5 wt % of the (B1) LITX 50 carbon black. Replicate the procedure of IE5 except use different proportions of the mixed masterbatch, neat pellets of (A1) LDPE, (AA1) ELVAX 260, and (B1) LITX 50 carbon black to give the semiconductive composite material of IE7 or IE8, respectively.

Comparative Examples 1 and 2 (CE1 and CE2): comparative composite materials prepared using constituent (A1) DOW LDPE 722, (AA1) ELVAX 260, and Vulcan XC 500 furnace carbon black. Replicate the procedure of Inventive Examples 1 and 3 except use Vulcan XC 500 furnace carbon black in place of (B1) LITX 50 carbon black to give the comparative composite materials of CE1 and CE2, respectively.

Comparative Examples 3 and 4 (CE3 and CE4): comparative composite materials prepared using constituent (A1) DOW LDPE 722, (AA1) ELVAX 260, and Acetylene Black AB 100%-01 carbon black. Replicate the procedure of Inventive Examples 1 and 3 except use Acetylene Black AB 100%-01 carbon black in place of (B1) LITX 50 carbon black to give the comparative composite materials of CE3 and CE4, respectively.

TABLE 1

Comparative composite materials CE1 to CE4 and Test Results.

| Constituent (wt %) | CE1 | CE2 | CE3 | CE4 |
|---|---|---|---|---|
| LDPE (A1) | 45 | 47.5 | 45 | 47.5 |
| EVA (AA1) | 45 | 47.5 | 45 | 47.5 |
| Vulcan XC 500 CB | 10.0 | 5.0 | 0 | 0 |
| AB 100%-01 CB | 0 | 0 | 10.0 | 5.0 |
| Example Total | 100.0 | 100.0 | 100.0 | 100.0 |
| Log(Volume Resistivity) (no thermal cycling) log(Ohm-cm) | 14.4 | 14.7 | 14.5 | 14.8 |
| Total BET N2 surface area of CB in composite material (m$^2$/g) | 6.5 | 3.3 | 7.7 | 3.9 |

("0" means 0.00, N/m means not measured)

As shown by the data in Table 1, CE1 to CE4 have high resistivity at the given range of total BET N2 surface area of carbon black in the composite material, which are undesirable for semiconductive layers of power cables. The log (volume resistivity) values are >10 Log(Ohm-cm) at total BET N2 surface area of carbon black in composite material of 5.0 to 10.0 m$^2$/g; >12 Log(Ohm-cm) at total BET N2 surface area of carbon black in composite material of 2.0 to 5.0 m$^2$/g; >15 Log(Ohm-cm) at total BET N2 surface area of carbon black in composite material of 0.5 to 2.0 m$^2$/g. Comparative materials CE1 to CE4 contain prior conductive carbon blacks at various loadings to show loading-conductivity relationships. The results show that a volume resistivity of less than 100,000 Ohm-cm (less than 5 Log(Ohm-cm)) requires more than 20 wt % loading of these prior carbon blacks. Such high loadings make melt-processing and extruding/stranding the materials difficult and would lead to undesirable amounts of moisture uptake during operational use of power cables containing same.

of oil per 100 grams (mL/100 g), measured by Oil Absorption Number Test Method; and a water uptake of from 400 to 2400 parts per million (ppm, weight), as measured by a Moisture Uptake Test Method performed by drying a carbon black sample in a vacuum oven at 100° C. overnight, measuring the weight of the dried carbon black sample, placing the dried carbon black sample inside a chamber with well-controlled 80% relative humidity (RH) and a temperature of 24° C. for 24 hours to give a humidified carbon black sample, weighing the humidified carbon black sample, and calculating the amount of moisture uptake in weight parts per million using the following equation: amount moisture uptake=(weight of humidified carbon black sample−weight of dried carbon black sample) divided by weight of dried carbon black sample.

TABLE 2

Semiconductive composite materials IE1 to IE8 and Test Results.

| Constituent (wt %) | IE1 | IE2 | IE3 | IE4 | IE5 | IE6 | IE7 | IE8 |
|---|---|---|---|---|---|---|---|---|
| LDPE (A1) | 45 | 46.5 | 47.5 | 49 | 41.9 | 42.8 | 37.2 | 38.0 |
| EVA (AA1) | 45 | 46.5 | 47.5 | 49 | 51.1 | 52.2 | 55.8 | 57.0 |
| (B1) | 10.0 | 7.0 | 5.0 | 2.0 | 7.0 | 5.0 | 7.0 | 5.0 |
| Example Total | 100.0 | 100.0 | 100.0 | 100.0 | 100.0 | 100.0 | 100.0 | 100.0 |
| Log(Volume Resistivity) (no thermal cycling) log(Ohm · cm) | 1.8 | 2.8 | 8.2 | 14.1 | 2.1 | 4.0 | 2.7 | 4.7 |
| Log(Volume Resistivity) (after thermal cycling) log(Ohm · cm) | N/m | N/m | N/m | N/m | 1.8 | N/m | N/m | N/m |
| Total BET N2 surface area of CB in composite material (m$^2$/g) | 5.6 | 3.9 | 2.8 | 1.1 | 3.9 | 2.8 | 3.9 | 2.8 |
| Complex Viscosity (0.25% strain, 160° C.) @ 0.1 rad/s (Pa · s) | 4.36 × 10$^4$ | 1.95 × 10$^4$ | N/m | N/m | 3.57 × 10$^4$ | N/m | 2.00 × 10$^4$ | N/m |

("0" means 0.00, N/m means not measured)

As shown by the data in Table 2, IE1 to IE8 have low resistivity at given ranges of total BET N2 surface area of carbon black in the composite, which are desirable for semiconductive layers: the log(volume resistivity) values are 10 Log(Ohm-cm) at total BET N2 surface area of carbon black in composite of 5.0 to 10.0 m$^2$/g; 12 Log(Ohm-cm) at total BET N2 surface area of carbon black in composite of 2.0 to 5.0 m$^2$/g; 15 Log(Ohm-cm) at total BET N2 surface area of carbon black in composite of 0.5 to 2.0 m$^2$/g. The inventive examples clearly show that a greater conductivity (lower volume resistivity) can be achieved at the same loading of ULW-CB. A volume resistivity of less than 100,000 Ohm-cm (less than 5 Log(Ohm-cm)) is achieved with less than 20 wt % of ULW-CB. This provides an improved balance of conductivity and carbon black loading.

The invention claimed is:

1. A semiconductive composite material comprising (A) a non-polar polyolefin polymer in a first phase, (AA) a polar ethylene-based copolymer in a second phase, which is at least partially immiscible in the first phase, and an electrical conducting effective amount of (B) a carbon black (CB), which has a Brunauer-Emmett-Teller (BET) nitrogen surface area of from 35 to 190 square meters per gram (m$^2$/g), measured by BET Nitrogen Surface Area Test Method; and an oil absorption number (OAN) from 115 to 180 milliliters 2. The semiconductive composite material of claim 1 wherein the (B) CB is characterized by any one of limitations (i) to (iii): (i) the (B) CB has a BET nitrogen surface area from 40 to 63 m$^2$/g, measured by the BET Nitrogen Surface Area Test Method; and an OAN from 120 to 150 mL/100 g, measured by the Oil Absorption Number Test Method; (ii) the (B) CB has a BET nitrogen surface area from 120 to 180 m$^2$/g, measured by the BET Nitrogen Surface Area Test Method; and an OAN from 150 to 175 mL/100 g, measured by the Oil Absorption Number Test Method; and (iii) the (B) CB is a blend of the CBs of (i) and (ii).

3. A semiconductive composite material comprising (A) a non-polar polyolefin polymer in a first phase, (AA) a polar ethylene-based copolymer in a second phase, which is at least partially immiscible in the first phase, and an electrical conducting effective amount of (B) a carbon black (CB), which has a surface wettability profile characterized by wettability≤0.0101 at surface coverage of 0.02, and wettability≤0.0101 at surface coverage of 0.04, and wettability≤0.0099 at surface coverage of 0.06, and wettability≤0.0111 at surface coverage of 0.08, and wettability≤0.0113 at surface coverage of 0.10, measured by inverse gas chromatography (IGC) according to Wettability Test Method; and a water uptake of from 400 to 2400 parts per million (ppm, weight), as measured by a Moisture Uptake Test Method performed by drying a carbon black sample in a vacuum oven at 100° C. overnight, measuring the weight of the dried carbon black sample, placing the dried carbon black sample inside a chamber with well-controlled 80% relative humidity (RH) and a temperature of 24° C. for 24 hours to give a humidified carbon black sample, weighing the humidified carbon black sample, and calculating the amount of moisture uptake in weight parts per million using the following equation: amount moisture uptake=(weight of humidified carbon black sample-weight of dried carbon black sample) divided by weight of dried carbon black sample.

4. The semiconductive composite material of claim 1 wherein the (B) CB is characterized by any one of limitations (i) to (iii): (i) a BET nitrogen surface area from 40 to 180 m²/g, measured by the BET Nitrogen Surface Area Test Method; (ii) a surface wettability profile characterized by wettability≤0.0058 at surface coverage of 0.02, and wettability≤0.0070 at surface coverage of 0.04, and wettability≤0.0075 at surface coverage of 0.06, and wettability≤0.0086 at surface coverage of 0.08, and wettability≤0.0091 at surface coverage of 0.10, measured by IGC according to the Wettability Test Method; and (iii) both (i) and (ii).

5. The semiconductive composite material of claim 1 that is free of any carbon black other than the carbon black.

6. The semiconductive composite material of claim 1 characterized by any one of limitations (i) to (v): (i) comprising from 61.0 to 99.0 wt % of a combination of the (A) non-polar polyolefin polymer and the (AA) polar ethylene-based polymer; and from 39.0 to 1.0 wt % of the (B) CB, based on total weight of the semiconductive composite material; wherein the combination of (A) and (AA) has from 5 to 95 wt % of (A) and from 95 to 5 wt % of (AA) based on the combined weight of (A) and (AA); (ii) the (A) non-polar polyolefin polymer is a non-polar ethylene-based polymer; (iii) both (i) and (ii); (iv) the (A) non-polar polyolefin polymer is a non-polar propylene-based polymer; and (v) both (i) and (iv).

7. The semiconductive composite material of claim 1, further comprising at least one additive chosen from: (C) a plastomer; (D) an antioxidant; (E) an organic peroxide; (F) a scorch retardant; (G) an alkenyl-functional coagent; (H) a nucleating agent; (I) a processing aid; (J) an extender oil; (K) a stabilizer.

8. The semiconductive composite material of claim 1, characterized by a log (volume resistivity), measured by Volume Resistivity Test Method, of <3.0 log (Ohm-centimeter (Ohm-cm)) at an electrical conducting effective amount of 10.0 wt %, or <4.0 log (Ohm-cm) at an electrical conducting effective amount of 7 wt %, or <10.0 log (Ohm-cm) at an electrical conducting effective amount of 5 wt %, or <15.5 log (Ohm-cm) at the electrical conducting effective amount of 2.0 wt %, wherein electrical conducting effective amount of the (B) 64-W-CB is based on total weight of the semiconductive composite material.

9. The semiconductive composite material of claim 1 characterized by a log (volume resistivity) of ≤10 Log (Ohm-cm) at total BET N2 surface area of carbon black in composite of 5.0 to 10.0 m²/g; or ≤12 Log (Ohm-cm) at total BET N2 surface area of carbon black in composite of 2.0 to 5.0 m²/g; or ≤15 Log (Ohm-cm) at total BET N2 surface area of carbon black in composite of 0.5 to 2.0 m²/g.

10. A method of making the semiconductive composite material of claim 1, the method comprising mixing the (B) carbon black (CB) into a melt of the (A) non-polar polyolefin polymer and (AA) polar ethylene-based copolymer to give the semiconductive composite material as a melt blend comprising constituents (A), (AA), and (B).

11. A crosslinked polyethylene product that is a product of curing the semiconductive composite material of claim 1.

12. A manufactured article comprising a shaped form of the semiconductive composite material of claim 1.

13. An electrical conductor device comprising a conductive core and a semiconductive layer at least partially covering the conductive core, wherein at least a portion of the semiconductive layer comprises the semiconductive composite material of claim 1.

14. A method of conducting electricity, the method comprising applying a voltage across the conductive core of the electrical conductor device of claim 13 so as to generate a flow of electricity through the conductive core.

15. A thermally cycled semiconductive composite material made by subjecting the semiconductive composite material of claim 1 to a thermal cycle comprising heating the semiconductive composite material to from 170° to 190° C. for 1 to 5 minutes, and then cooling to 30° C. to give a cooled, thermally cycled semiconductive composite material.

* * * * *

UNITED STATES PATENT AND TRADEMARK OFFICE
CERTIFICATE OF CORRECTION

| | | |
|---|---|---|
| PATENT NO. | : 12,293,857 B2 | Page 1 of 1 |
| APPLICATION NO. | : 16/977603 | |
| DATED | : May 6, 2025 | |
| INVENTOR(S) | : Tian Lan et al. | |

It is certified that error appears in the above-identified patent and that said Letters Patent is hereby corrected as shown below:

In the Claims

In Claim 8, Column 26, Line 10, replace line "effective amount of the (B) 64-W-CB is based on total" with --effective amount of the (B) CB is based on total--

Signed and Sealed this
Twenty-eighth Day of October, 2025

John A. Squires
*Director of the United States Patent and Trademark Office*